No. 767,596. PATENTED AUG. 16, 1904.
W. H. PIKE, Jr.
ADDING MACHINE.
APPLICATION FILED APR. 23, 1904.
NO MODEL. 7 SHEETS—SHEET 1.

Fig. 1.

Witnesses

Inventor
William H. Pike Jr
by Foster, Freeman & Watson,
Attorneys

No. 767,596. PATENTED AUG. 16, 1904.
W. H. PIKE, Jr.
ADDING MACHINE.
APPLICATION FILED APR. 23, 1904.
NO MODEL. 7 SHEETS—SHEET 4.

Witnesses
J. G. Hinkel
Arthur L. Bryant

Inventor
William H. Pike Jr
by Foster, Freeman & Watson,
Attorneys

No. 767,596. PATENTED AUG. 16, 1904.
W. H. PIKE, JR.
ADDING MACHINE.
APPLICATION FILED APR. 23, 1904.
NO MODEL. 7 SHEETS—SHEET 7.

Witnesses
Inventor
William H. Pike Jr.
by Foster, Freeman & Watson,
Attorneys

No. 767,596.

Patented August 16, 1904.

UNITED STATES PATENT OFFICE.

WILLIAM H. PIKE, JR., OF ORANGE, NEW JERSEY, ASSIGNOR TO PIKE ADDING MACHINE COMPANY, OF ORANGE, NEW JERSEY, A CORPORATION OF MISSOURI.

ADDING-MACHINE.

SPECIFICATION forming part of Letters Patent No. 767,596, dated August 16, 1904.

Application filed April 23, 1904. Serial No. 204,620. (No model.)

*To all whom it may concern:*

Be it known that I, WILLIAM H. PIKE, Jr., a citizen of the United States, residing at Orange, in the county of Essex and State of New Jersey, have invented certain new and useful Improvements in Adding-Machines, of which the following is a specification.

My invention relates to adding-machines, and more especially to an adding-machine constructed so as to record either totals or subtotals by an operation wholly of the machine itself after the adjustment of the parts; and my invention consists in providing a single operating device adapted to be set in different positions to adjust the parts as required and in certain features of construction fully set forth hereinafter and illustrated in the accompanying drawings, in which—

In order to illustrate my improvements, I have shown the same in connection with such parts of an adding-machine as will enable the construction and operation of the improvements to be understood, but without any attempt to set forth all the details of a complete operative machine.

In the drawings there is shown a base-frame A, upon which is supported the operating parts, including a working rock-shaft 922, to which movement is imparted in any suitable manner after all the parts of the mechanism have been set to secure the record of a number or a total whether or not the total is retained as a subtotal to be included in a subsequently-obtained total.

*The adding or accumulating means.*—The recording devices, as shown, consist of type-levers 403, Figs. 1 to 4, one to each series of keys, and which oscillate on a shaft 420, and each is jointed to a strip 404, carrying a rack 405, which actuates the pinions 385, secured to the adding-wheels 313, carried by a swinging frame D. Fixed pawls 307 (shown particularly in Figs. 1, 11, 12, and 13) serve to lock the pinions 385 to prevent accidental turning. Each rack 405 is capable of a sliding movement on the strip 404, to which it is connected by a spring 460. A lug 461, Figs. 11 and 12, on the rack projects into a recess 462 in the strip and limits such sliding movement of the rack relative to its associated strip. When the adding-wheels are turned in the direction of the arrow in Fig. 11, the shoulders $311^a$ of cams 311 (one at the side of each wheel) are carried away from lugs $303^a$ on detents 303, and the inclined edge $g$ of each cam 311 will nearly contact with the end of its detent 303 when the wheel has been turned nine units or steps. In moving the tenth step the edge $g$ will depress the detent, which will thus carry a lug $303^b$ on the detent 303 out of the path of a stud $405^a$, Figs. 11 and 13, on the rack that coacts with the adding-wheel of the next higher order of numbers, and the rack will thus be permitted to move a step beyond its normal position at rest, and thus move its coacting pinion and adding-wheel a step upon the completed revolution of the cam 311 of the wheel of the lower order. When the detent 303 is depressed, a vertical pawl 304, Figs. 11 and 12, will move forward over a shoulder $h$ of the detent and then prevent it from rising until a frame G, Figs. 3, 11, and 12, swings back a bar 324, carried thereby, and pushes back the pawls 304 from off the shoulders $h$ of the detents 303, which are then lifted by springs $303^c$. The frame D is swung to carry the pinions of the adder-wheels into and out of engagement with the racks by either of two independent means actuated from the working shaft. Thus the left-hand arm 305 of the frame D, Figs. 3 and 4, connects with a toggle-link 310, jointed to the other toggle-link 309, the movement of the toggle raising and lowering the frame D. The toggle is operated from a reciprocating link 714, the movement being limited by a lug on a plate 310$^a$ at the end of the link 310. The link 714 is connected to an arm 710, Fig. 2, and as the shaft 922, Figs. 1, 2, and 7, oscillates in one direction the rear shoulder 901$^a$ on a plate 901 on said shaft contacts with a stud 750 on the lever 710, which swings forward. The return movement brings the shoulder 901$^b$ to the stud, swinging back the lever 710.

Figure 9:
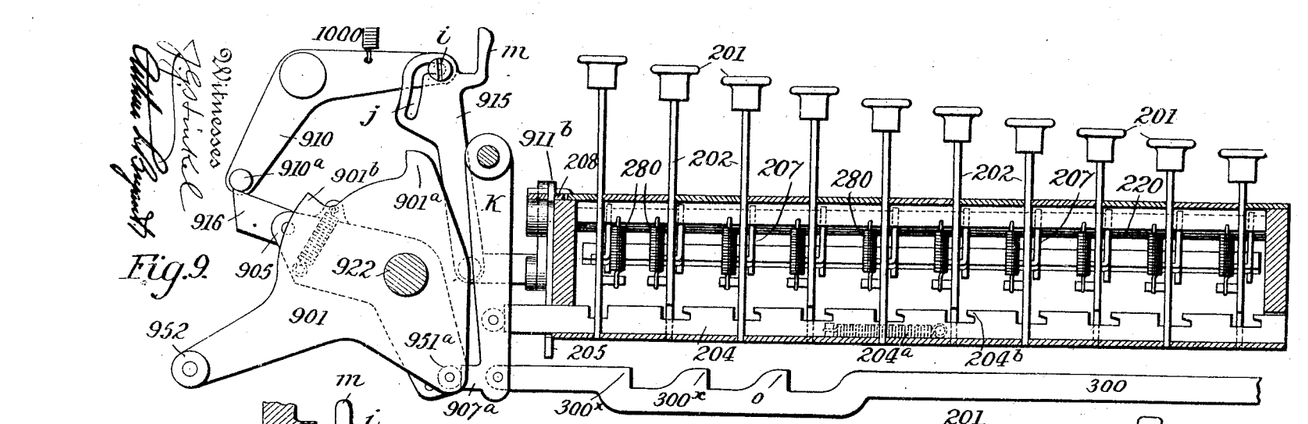
Fig. 9 is a sectional view of the key-operated mechanism.
Figure 10:
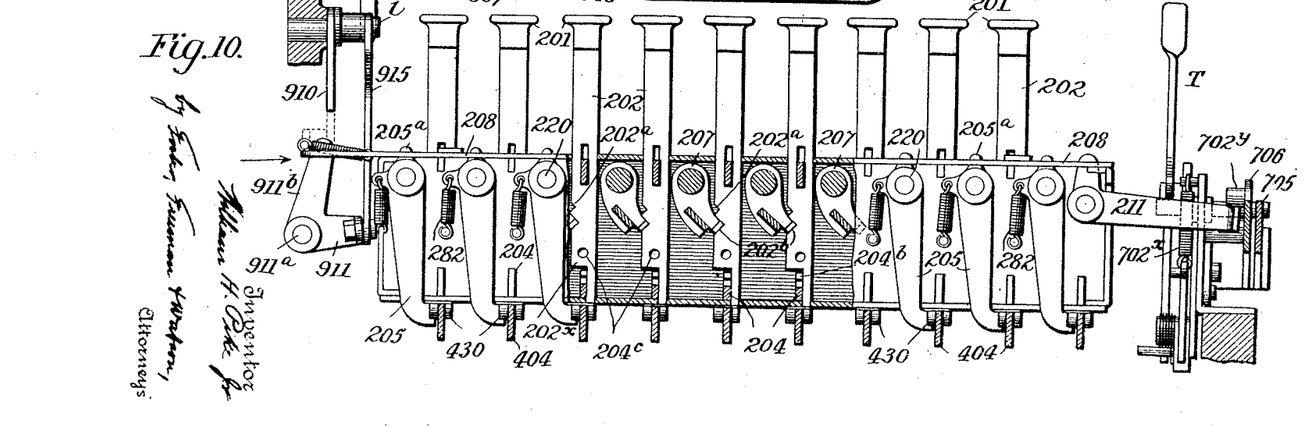
Fig. 10 is a transverse sectional view of Fig. 9.

The stem 202, Figs. 9 and 10, of each numbered key 201 has notches 202$^a$ and 202$^b$ of different depths. Springs 280 lift the keys, and pawls 207, which are secured to longitudinal shafts 220, engage the notches and hold down the keys, the pawls of each series of keys being on the adjacent shaft, so that after one key of a series is depressed the depression of another key in the same series will swing out all the pawls and release the depressed key, which will rise. The depression of the upper blank key of a row swings the pawls to liberate a key of that row improperly depressed, the upper key rising as soon as pressure is removed therefrom, as the notches of such keys are not so arranged that they will be held down by the pawls. On depressing a key the lower end of its stem is brought into the path of one of a series of studs or stops 430, projecting in both directions from the coacting rack-strip 404, and the key-stem thus limits and defines the subsequent movement of the strip and its rack and the extent to which the number-wheel is turned, the stops 430 being progressively farther from the key-stems, so the strip moves to a greater extent in proportion as the key depressed indicates a higher number, as shown, and the parts are arranged so that each strip has a movement of one step at each operation of the machine, even if no keys may have been depressed. This will bring the cipher-printing character into printing-line, but without turning the adding-wheel. The normal position of the stop 430 on the strip 404, which coacts with each key numbered "1," is two steps to the rear of said key, the position of the other stops 430 being progressively one step farther to the rear of its coacting key-stop, the stud 430, which coacts with each "9" key, being ten steps away. A detent-arm 205, Figs. 1, 8, 9, and 10, secured on each shaft 220 near its end, is held in the path of the stop 430 on the strip 404 near the No. 9 key by a spring 282, which also tends to turn the shaft 220 and hold the pawls 207 against the key-stems and in the notches thereof. When all the keys in a column are up, the pawls 207 are all in the deep notches 202$^b$, and the detent-arm 205 of each shaft acts as a stop for the coacting strip 404, which can only move one step forward until its stop 430 strikes the arm 205, securing the result before stated. When one of said keys is depressed, its pawl 207 is swung out from the deep notch and then enters the shallow notch 202$^a$ and holds the key down, and all the coacting pawls swing out, but not far enough to remove them from the deep notches 202$^b$ of the other keys of the series; but the coacting detent-arm 205 is carried out of the path of the stop 430 on the strip 404, which can then slide forward until its adjacent stop 430 strikes the stem of the depressed key.

Figure 1:
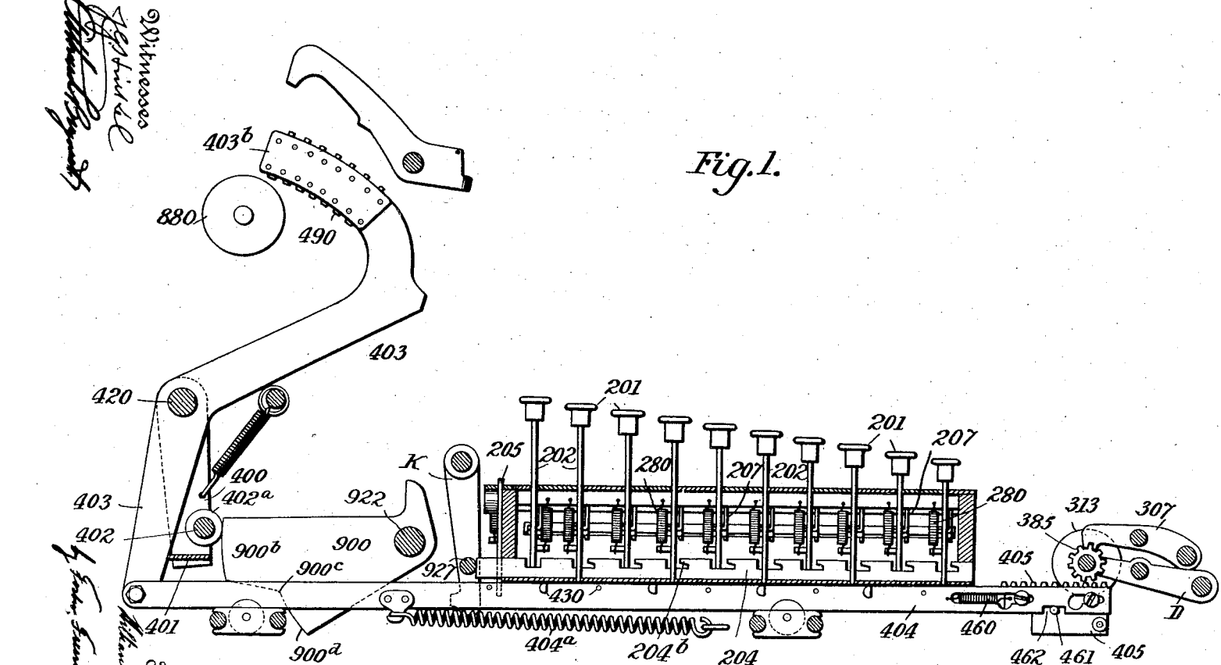
Figure 1 is a longitudinal central section of a portion of an adding-machine embodying my improvements.
Figure 2:
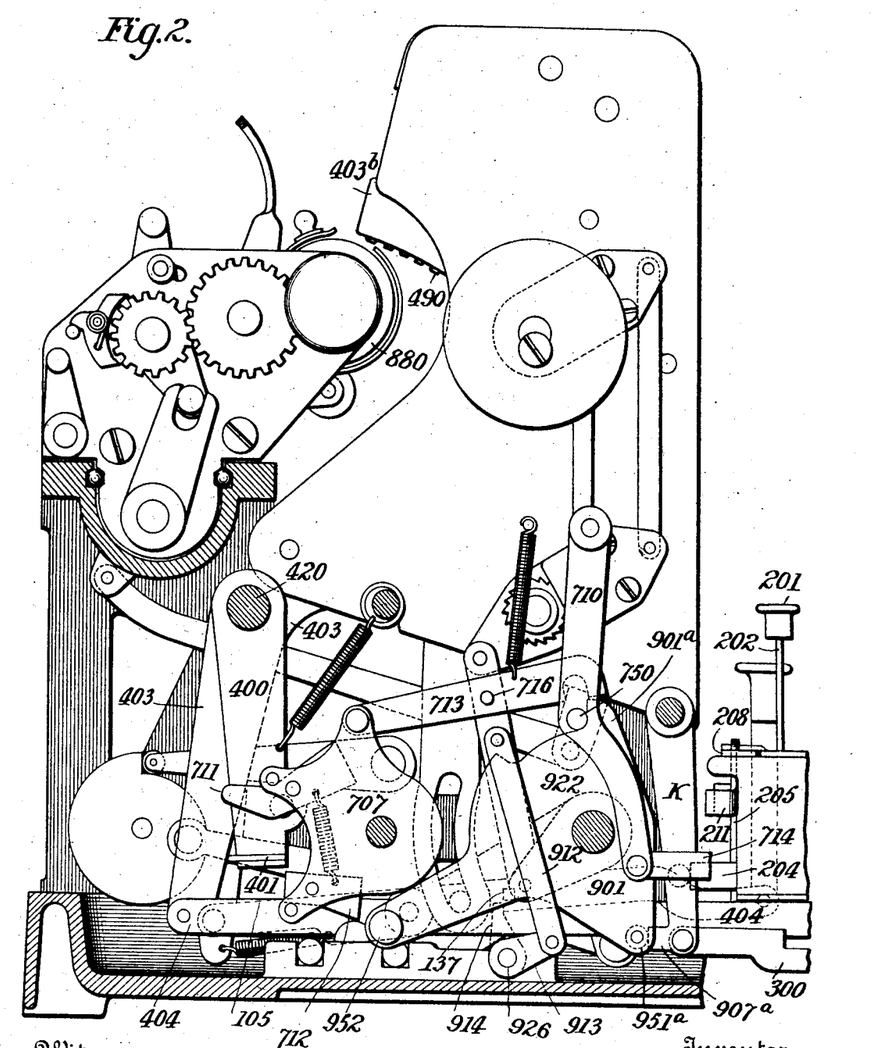
Fig. 2 is a view, partly in section, on an enlarged scale, of the rear part of the machine.

The type-lever shaft 420, Figs. 1 and 2, carries two pendent arms 400, connected by a cross-strip 401 and cross-rod 402, the latter carrying a roll 402$^a$, Fig. 1, which bears on a cam-plate 900 on the shaft 922. The strip 401 holds the lower ends of the type-levers 403 in their rearmost positions each against the tension of a spring 404$^a$.

The rack-strip 404 of each column at each operation where no keys are depressed moves forward one step until arrested by the detent-arm 205, and in this case the rack of said strip will not be moved. When a numbered key is depressed, the strip 404 moves forward until its stop strikes the stem of said key, carrying the rack, without turning the pinions, the frame D being normally elevated. After the movement of the strips ceases the frame D and pinions are depressed automatically, and each rack engages the pinion and on returning turns the pinion and adding-wheel, the extent of revolution depending on the distance the strip 404 in returning to its position moves the rack.

Figure 3:
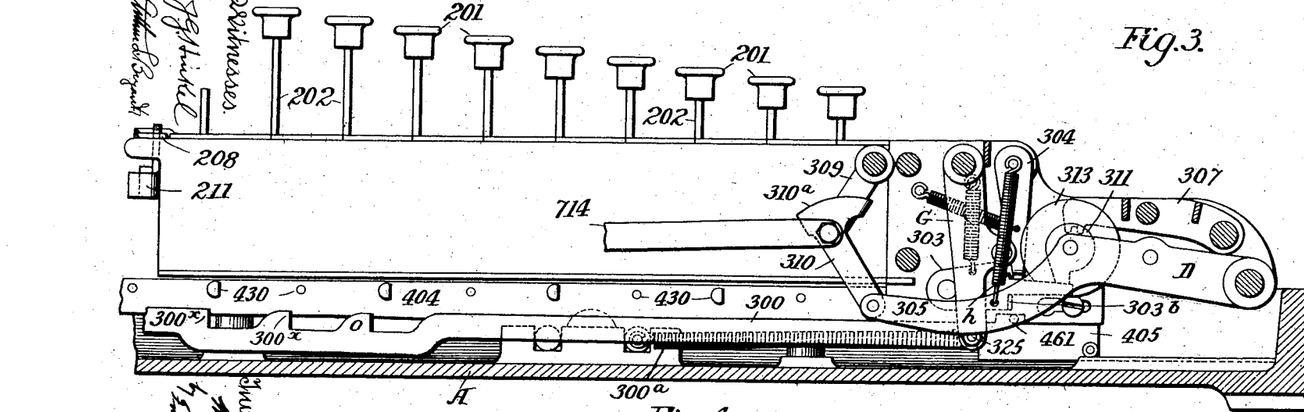
Fig. 3 is a similar view of the front part of the machine.
Figure 4:
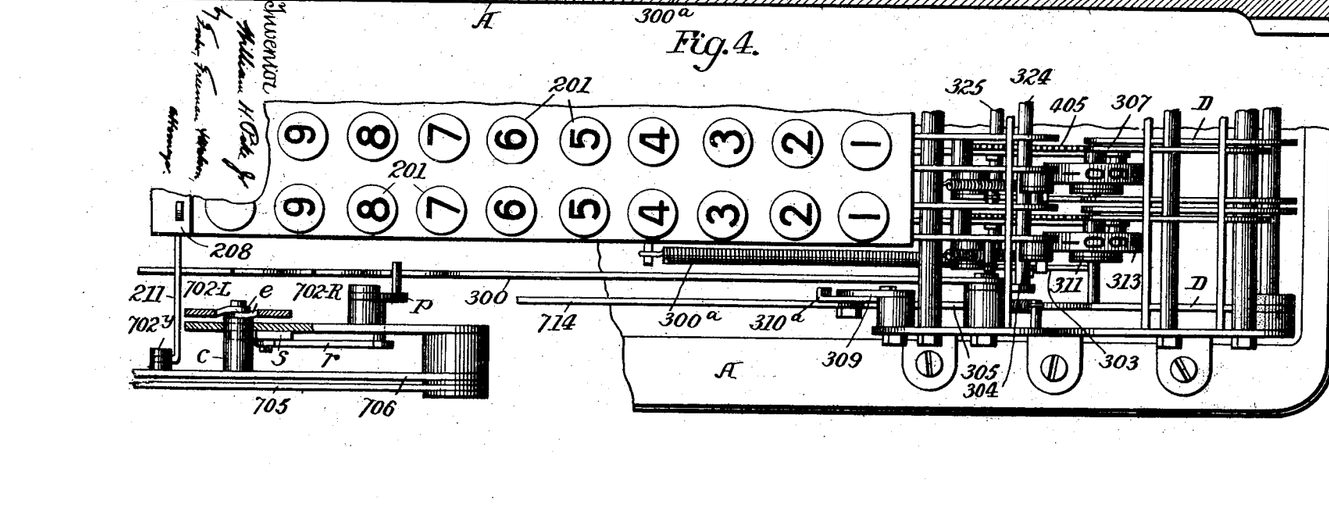
Fig. 4 is a plan of the part shown in Fig. 3.

To the swinging frame G, Fig. 3, are attached two longitudinal rods 300, Figs. 2, 3, 4, 5, 6, and 7, connected to a swinging frame K, Figs. 1, 2, 5, 7, and 9. A roller-stud 951$^a$ on the plate 901, Figs. 2 and 9, and a similar roller-stud on a rocking arm at the opposite side of the machine when the machine is at rest are in contact with projections 907$^a$ on the frame K, and the swinging frame G is thus held in forward position.

Figure 13:
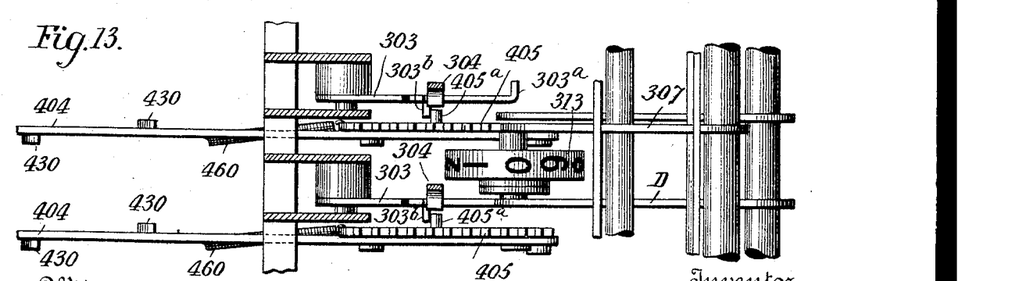

In operating the machine the shaft 922 is rocked, and the said roller-studs are first withdrawn from the projections 907$^a$ on the two rods 300, and the frame G is drawn to the rear by springs 300$^a$, so that the pawls 304, Fig. 11, will bear against the edges below the shoulders $h$ of the detents 303 under spring tension, and the racks 405 can be drawn by their springs 460 backward, with the lugs 405$^a$, Fig. 13, resting against the lugs 303$^b$. When a number key or keys have been depressed and the working shaft is operated, each cooperating strip 404 is carried forward to an extent depending on the key depressed. The frame D is then depressed to bring each pinion 385 into engagement with its rack 405, and on the next backward movement of each strip the number-wheel is turned to an extent corresponding to that to which the rack was carried forward. If any one wheel is turned sufficiently to depress the adjacent detent 303, the backward swing of the frame G will then permit the pawl 304 to swing back, when having escaped contact with the edge in front of the shoulder $h$ it passes above said shoulder as the cam 311 depresses the detent, and the pawl 304 then holds down the detent until the wheel completes its movement and the action of carrying to the next wheel is effected. As the movements of the working parts of the machine terminate the frame G swings forward, and the pawls 304 are swung forward to normal position and release the detents 303, which then rise. This also moves the racks 405 forward to normal position by the contact therewith of the cross-bar 325, carried by the arms of the frame G.

It will be understood that each spring 460 forms a flexible connection between one of the strips 404 and the rack 405, supported by said strip. Normally the detent $303^b$ holds the rack 405 in such position that the spring 460, connected to that rack, is under tension.

If during the operation of the machine the strip 404 and rack 405 of the order to which an additional carrying operation is to be imparted are stationary or in their normal positions at the time the cam 311 of the wheel 313 of the next lower order rocks the lever 303, the spring 460, being as aforesaid under tension, collapses, and although the strip 404 remains stationary the rack 405 is moved relative to said strip through a distance corresponding to one step. If, however, the spring and rack of the order to which the carrying is to be transmitted be in motion at the time when the detent $303^b$ is removed from the path of the stud $405^a$, the rack will continue to move with the strip 404 throughout the entire movement of the latter, the spring 460 acting at such time merely as a connecting-link between the strip and rack and will not be stopped, as it commonly is, one step before the strip 404 completes its rearward movement—that is, in the latter case the rack and strip will move together throughout the entire rearward movement of the strip, whereas normally the detent $303^b$, acting on the stud $405^a$, stops the rearward movement of the rack one step in advance of the completion of of the corresponding movement of the strip.

Figure 11:
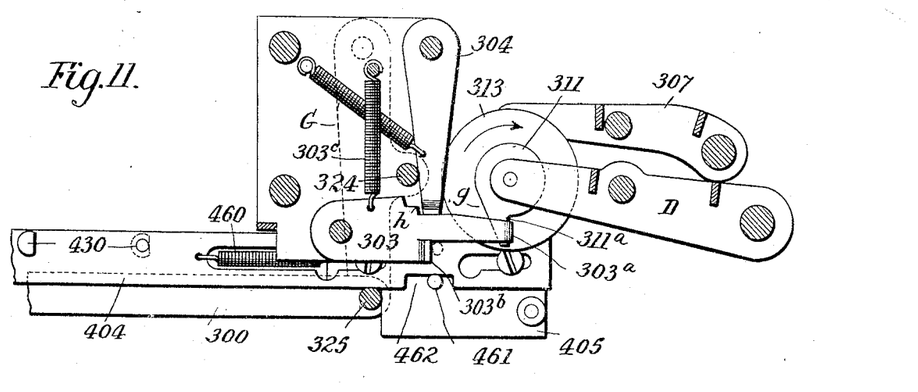
Figs. 11 to 13, inclusive, are detail views of the adding mechanism.
Figure 12:
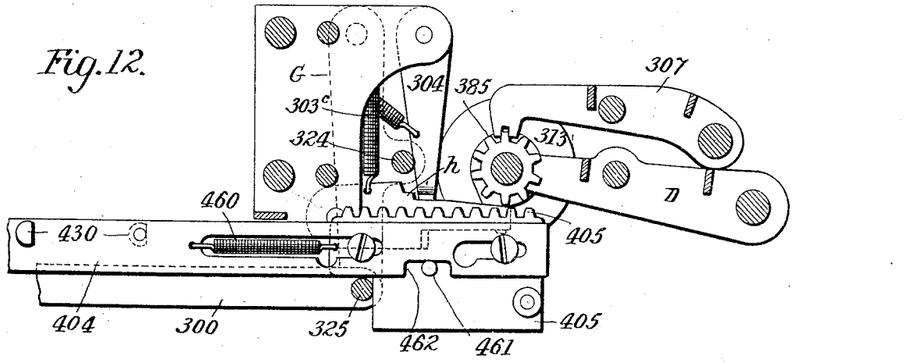

*The recording means.*—The roller-platen 880, Figs. 1, 2, and 11, is below the curved arms $403^b$ of the type-levers 403, each, as shown, carrying ten sliding type-bars 490. At each full operation effected by one rocking movement of the shaft 922 each type-carrier will move at least one step, so that in all columns where no key is depressed the carriers will be in position to print ciphers and in columns where keys are depressed the carriers will be moved different degrees to bring each type-bar in position to print a figure corresponding to the key depressed in such column.

*The adding or accumulating operations.*—To add different amounts together, the proper keys are depressed and the shaft 922 is suitably rocked, and the main cam 900, Fig. 1, will be rocked to permit the type-levers and strips 404 to move under the influence of the springs $404^a$ until in those columns where no keys are depressed the strips are arrested by the detents 205, and where keys have been depressed the strips are arrested by their respective key-stops. The racks 405 remain stationary until the strips 404 have each moved one unit, when the racks will also move. This permits each strip when no key is depressed to move sufficiently to bring the type-carrier into position to print a cipher at the printing-line. The first portion, $900^b$, of the cam 900, Fig. 1, permits no movement of the levers 403, a second portion, $900^c$, permits the entire forward movement of the bars 404, and a third portion, $900^d$, does not affect the movement of said parts. This allows certain movements of other parts while the strips 404 and racks 405 are not in motion. After the strips are arrested the pinions are thrown into gear with the racks, and on the return motion of the cam 900 the strips 404 and racks 405 are returned to their normal position, the racks turning the pinions a number of units, depending on the extent of return movements of the strips 404 and equal to the numbers expressed by the depressed keys. The final part of the return movement of the shaft 922 causes the plate 901, Figs. 2 and 5, to move the lever 710 and the link 714 to break the joint of the toggle 309 310 and permit the frame D, Fig. 12, to rise and disengage the pinions from the racks.

To lock down a depressed key and lock all other keys in the same series against depression during the operating movements of the shaft 922, a series of sliding strips 204, Figs. 9 and 10, have projections $204^b$, adapted to enter holes $204^c$ in the key-stems which are depressed. The strips are moved in one direction by springs $204^a$ and in the other by a cross-rod 927, carried by the frame K, Figs. 1 and 9. When the shaft 922 begins to oscillate, the frame K will swing and allow the strips 204 to move toward the rear under shoulders $202^x$ of keys that are not depressed and hold them up, and a projection $204^b$ will enter the hole $204^c$ of a depressed key and lock it down, even if its pawl be accidentally disengaged from its notch $202^a$.

The shafts 220 can be rocked automatically to throw out all the pawls 207 by a sliding cross-strip 208, having elongated slots, into which project lugs $205^a$ on the arms 205. This is effected from the rocking of the shaft 922. Thus at the commencement of the motion of the shaft 922 the arm 905 carries a latch 916 past a stud $910^a$ on a lever 910, a spring permitting the latch to yield and pass by the stud, and on the return motion of the shaft 922 the beveled edge of the latch 916 contacting with the stud 910ª swings the lever 910 and passing by permits the lever to return to its normal position under the action of a spring 1000. This lever 910 is connected by a link 915 with an angle-lever 911, pivoted at 911ª to the side frame and provided with an arm 911ᵇ, which extends loosely through a slot in the end of the strip 208, and the movement of the lever 910 will thus rock the lever 911 and slide the strip 208 in the direction of the arrow, and thereby withdraw all the pawls 207 and release any key which may have been depressed. Preferably the lever 910 is provided with a pin or stud $i$, which extends into an angle-slot $j$, formed in the link 911, and said link is provided with a projection $m$ or connected with a suitable hand-lever by which it may be rocked about its pivot. When the parts are in the position shown, the operation will be as above described and all of the depressed keys will be released at each actuation of the lever 910. If, however, the lever 915 is moved so that the pin $i$ is brought into the substantially vertical portion of the angle-slot $j$, it will be seen that the rocking of the lever 910 will not cause any movement of said link, and therefore the previously-depressed keys will not be released. This constitutes a repeating mechanism, the number represented by the depressed keys being repeated at each actuation of the machine until the link 915 is restored to the position shown.

*Recording totals and subtotals.*—To record the total, it is necessary to control the movements of the recording devices by the accumulating mechanism—as, for instance, by controlling the movements of the racks by the pinions of the wheels 313, the racks in such case being engaged with the pinions when the racks and the strips 404 are moving forward under the action of the springs 404ª. The rotatory movement of the pinions and wheels 313 is thus in the reverse direction to that when accumulating, the effect being that the amount accumulated is subtracted as the wheels and pinions return to the zero position. The pinion-cams 311, Figs. 11 and 13, arrest the reverse rotation of the wheels at the zero position when their shoulders engage the lugs 303ª of the detents 303. As in accumulating the wheels have advanced in the direction of the arrow, Fig. 11, a number of steps from the zero position, so in returning to the zero position the racks and strips are allowed to move forward the same number of steps until the shoulders of the cams contact with the detents, thus moving the type-levers correspondingly and bringing the proper types in position to indicate the total as accummulated. The accumulating-wheels will be left at zero after registering or printing the total, except when the total is to be reaccumulated on the wheels 313, which is effected by keeping the racks and pinions engaged when the racks are again moved to the rear or restored. These results are effected by so setting the parts as to vary the times of engaging and disengaging the racks and pinions, and one means of doing this is by two bars distinguished as "total" and "subtotal" bars 702ᴿ and 702ᴸ, Figs. 7, 9, and 10.

At the rear of shaft 922 is a shaft on which rocks a plate 707, carrying two dogs 711 712, normally held in contact with stops by a connecting-spring. (Shown in dotted lines.) To this plate is pivoted a link 713, which is raised by a spring and has a notch adapted to engage the stud 750 in the lever 710. Two parallel levers 705 706 extend past the bars 702ᴸ 702ᴿ, Figs. 5 and 6, and past the plate 901, and the lever 706 is connected by a link 715 and pin 716 with the link 713.

The total and subtotal bars might be operated as keys by direct pressure of the hand; but it has been found that when operations have to be quickly performed an operator may either become confused or may push down the wrong bar or key by mistake. To remedy this difficulty, I combine with the bars a single operating device capable of being set in different positions, as there is far less opportunity for mistake or confusion in shifting one part to different positions than in choosing between two parts. Different means may be employed for shifting the two bars or equivalent parts from one device. As shown, I use a control device, as a lever T, Figs. 5, 6, and 7, pivoted at the lower end and with two arms, one extending over one bar and the other over the other bar, and by swinging this lever in different directions one or the other bar can be depressed. The bars have overlapping projections $e$ $e$, Fig. 7, and if either is depressed its projection $e$ will make contact with a stud $c$, projecting inward from the lever 706 and depress the latter and its connected link 713, the slot in which engages the stud 750 on the lever 710, so that the lever 710 and link 714 will be operated from the plate 707. When the shaft 922 commences to move, the roll 952 on the arm of the plate 901, moving upward, contacts with the rear edge of a dog 712, rocking the plate 707 in the reverse direction of its arrow, and the link 713, (now connected to the lever 710,) through the link 714 and connections, straightens out the toggle and depresses the frame D, causing the pinions to engage the racks as the strips 404 move forward with the racks until the wheels 313, turning in the reverse direction of the arrow, return to the zero position, where they are arrested by the shoulders of the cams 311 contacting with the projections 303ª of the detents 303. The racks will be held in their forward position during the printing action while the part 900ᵈ of the cam 900 moves in one direction past the roll 402ª. On the return movement the roll 952 contacts with the forward edge of the upper dog 711 and rocks the plate 707 in the direction of its arrow and the link 713 pulls the lever 710 rearwardly, bending the toggle and lifting the frame D, disengaging the pinions from the racks. The continued movement of the cam 900 in the direction of its arrow restores the racks to their forward position. The subtotal-bar 702$^L$, Figs. 5, 6, 7, 8, and 10, operates also on the second lever 705, Fig. 6, which has a lug 705$^a$, Fig. 5, which when the lever is depressed, contacts with the tail of the dog 711 and depresses the tail of this dog, swinging it out of the path of the roll 952, which therefore in such case cannot operate it to rock the plate 707 and renders the said plate then inoperative to shift the lever 710 and the racks. The subtotal-bar stud 737$^L$ projects over both the levers 705 and 706, so that when the subtotal-bar is depressed the lever 706 is carried down with the lever 705 and the open-slotted link 713 is engaged with the stud 750 on the lever 710, and therefore when the machine is thus operated the pinions are thrown into engagement with the racks on the plate 707, being rocked by the contact of the stud 952 and dog 712 before the racks move forward, and they continue engaged on the reverse movement (as the stud 952 on descending will not contact with the dog 711$^a$) until the racks are restored to their rear position, when the frame D is raised and the pinions are disengaged by the action of the front shoulder 901$^b$, Fig. 7, on the plate 901 contacting with the stud 750 on the lever 710, as in accumulating.

Figure 7:
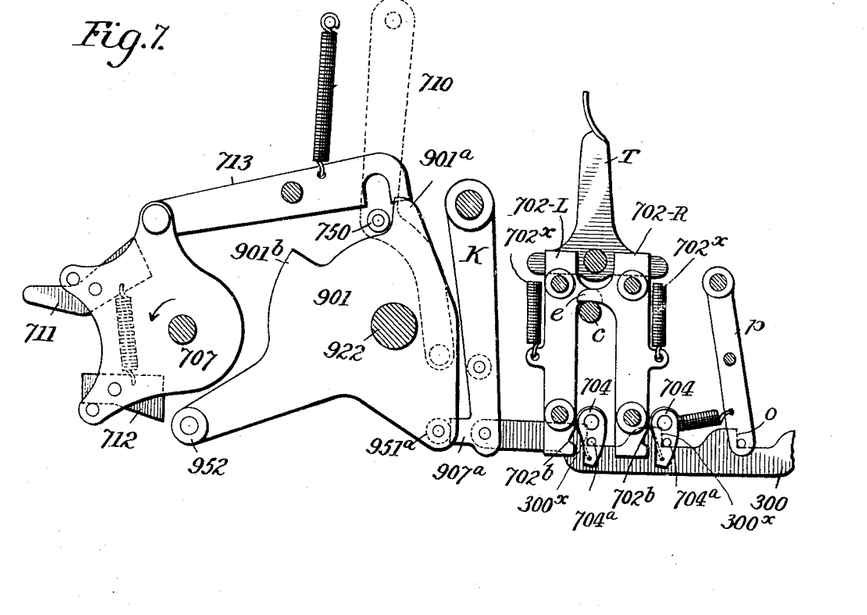
Figs. 7 and 8 are views of parts of the mechanisms shown in Figs. 4 and 5.
Figure 8:
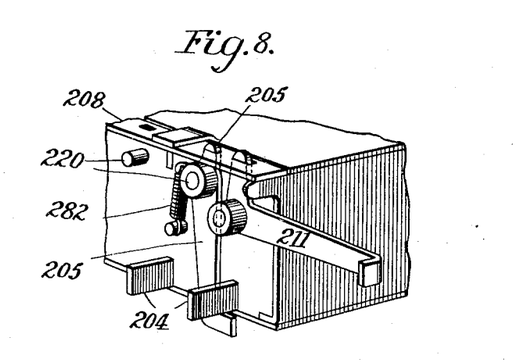

To prevent both total and subtotal bars being depressed at the same time, an anchor-plate 703, Fig. 7, is pivoted between the total-bars 702$^R$ and 702$^L$ and normally held in a central position by a spring 703$^a$. The plate has two projecting arms 703$^b$ with angular faces, and on each total-bar is a stud 702$^a$ in position to contact with one of the projecting arms. When either of the bars 702$^L$ 702$^R$ is depressed, its stud swings an anchor-plate 703 out of its path and under the other stud, thus preventing the other bar from being depressed, so that both cannot be depressed at once.

There are two pawls 704, Fig. 7, each adapted to engage a notch 702$^b$ in a total-bar, and each pawl has a stud 704$^a$, which when the machine is at rest engages a shoulder 300$^\times$ of the connecting-rod 300, and when the shaft 922 has about completed its movement the rod 300 will be moved with the frame K toward the front of the machine and its shoulder 300$^\times$ will engage the stud 704$^a$ on the pawl and disengage the latter from its total-bar, and the bar will then rise under the influence of its spring 702$^\times$.

It is desirable to prevent the machine from being operated when either of the total-bars is in a partly-depressed position, and to this end there is provided a detent, the same being a lug 137. There is connected to the slotted link 715, Fig. 5, a link 912, connected to an arm 913 on a cross-shaft 926, carrying also an arm 914, extending upward at the side of the starting-lever 105, and the lug 137 is on this lever and when the starting-key is depressed is in the path of movement of the arm 914. If either the arm 914 or lug 137 is moved slightly out of its normal position, the movement of the other is prevented. When a total-bar is duly depressed, the rock-shaft 926 has moved the arm 914 so as not to obstruct the lug 137, and the lever 105 can then be depressed. When either of the total-bars 702$^R$ or 702$^L$ is depressed, it is necessary to swing the detents 205 out of the paths of the studs 430, so the strips 404 and racks may move under the control of the pinions. This is effected by a projection 702$^y$, Fig. 5, on the lever 706, which, as aforesaid, is actuated by both the total-bars, which projection contacts with a bell-crank lever 211, Fig. 8, one end of which enters a slot in the strip 208, but does not interfere with the usual individual movements of the detents. When a total-bar is depressed, said projection 702$^y$ rocks the bell-crank lever 211 and moves the strip to the left, thus swinging all the detents out of their normal positions and releasing the strips 404.

From the foregoing it will be seen that the swinging of the lever 710 straightens or bends the toggle and is the means of throwing the racks and pinions into and out of gear and that in the normal operation of the machine in accumulating the lever 710 is swung forward by the contact of the shoulder 901$^a$ of the plate 901 to bring the gears into engagement, and on the next action the shoulder 901$^b$ reverses this arrangement. It will further be seen that when the total-bar 702$^R$ is depressed, depressing the levers 706 and 713, the lever 710 is then operatively connected with the plate 707, and as the plate 707 is rocked by the contact of the parts 952 and 712 the lever 710 swings with its stud 750 following the shoulder 901$^b$, so that the lever 710 swings forward, (when normally it would be at rest,) and the gears are engaged at once as the lever 710 begins its movement. The racks are therefore engaged with the pinions before the strips move forward. When on the reverse rocking of the shaft 922 the part 952 strikes the part 711, the plate 707 is rocked in the reverse direction and the lever 710 swung back, and the gears are disengaged when the wheels are at zero and before the racks move backward. When the subtotal-bar 702$^L$ is depressed and both the levers 705 and 706 carried down, the stud 705$^a$ so tilts the part 711 that it will not be struck by the part 952 and the plate 707 will not be rocked by the contact of these parts, so that the lever 710 will not swing back until the shoulder 901$^b$ strikes the stud 750 on said lever, with the result that the gears remain in engagement during the backward movement of the strips. When a total-bar is depressed and depresses the lever 706, the projection or lip 702$^y$ on said lever bears on a lip at the end of the horizontal arm of the lever 211 and rocks the latter, thus shifting the strip 208 and swinging all the detents out of their normal positions and out of the way of the stops on the strips 404.

Figure 5:
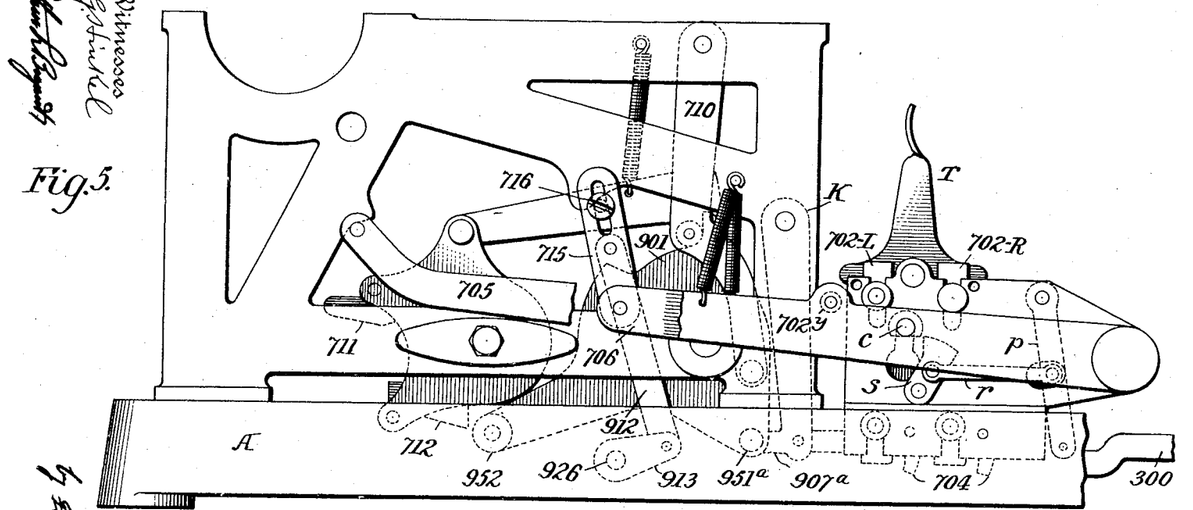
Fig. 5 is a side elevation showing the total and subtotal actuating mechanisms.
Figure 6:
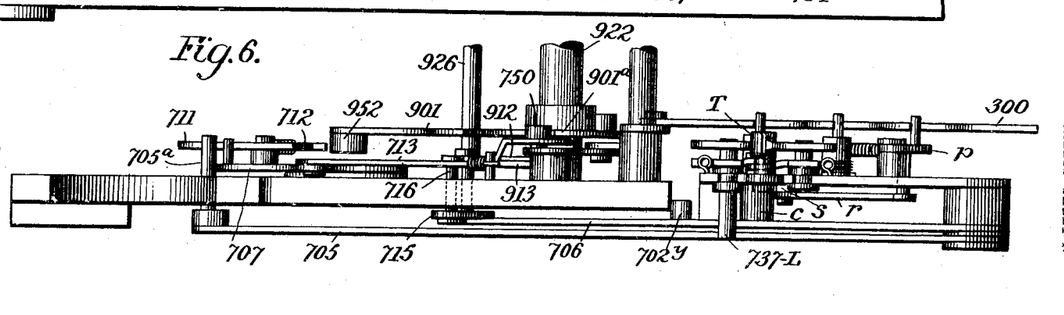
Fig. 6 is a plan view of the parts shown in Fig. 5.

The rod 300 adjacent to the bars 702$^L$ 702$^R$ has a shoulder $o$, Fig. 7, which by contact with an arm $p$, Figs. 5 and 7, swings it to the right, and thus through the medium of a connecting-link $r$ swings to the right a dog $s$. When in the reverse position, the end of the dog $s$ is below the stud $c$, which extends from the lever 706 over the dog and below the lapping shoulders or lugs $e\ e$ of the bars, thus preventing either bar or the lever 706 from being depressed until, near the end of the operation of the machine, the shoulder $o$ carries the arm $p$ and dog to a position to release the parts. A spring $t$ moves the arm $p$ in an opposite direction. The end of the dog is widened, so as to permit the dog to move to a greater degree before releasing the parts.

From the foregoing it will be seen that the accumulating devices may at different times be independently controlled by two wholly-independent operating means, which may be manipulated to determine the subsequent operations of the machine—first, the means that in accumulating puts the gears into engagement on one movement of the working shaft and out of engagement on the reverse movement; second, the means that in securing a total so sets the parts that the gears will be thrown into and out of connection at different times from that resulting from the first means in accumulating. Further, it will be seen that the said devices may be put under the joint action of both the said means in printing a subtotal. There are therefore devices capable of independent connection with the gears, one set of devices that only operate in accumulating and another set of devices that only operate in taking a total or subtotal. This distinguishes the machine herein set forth from all others.

The above-described machine also differs from all others in that the operations of the parts in printing a total or subtotal are all determined by the positions of devices adjusted or set in position before the operation of the machine begins and without any manipulation of the parts during the said operation—that is, causing the machine to print a total or subtotal is secured by the manipulation of parts wholly before commencement of the operation of the machine.

While I have shown my improvements in connection with one construction of adding mechanism, I have done so merely that the same may be illustrated in a practical form and not to limit it to combination with the particular construction illustrated, as I shall use the same wherever there are parts which by the movements of one operating device to different positions before the operation of the machine will secure the record of and clear the machine or record such total and retain it in the machine to be carried into a subsequent total.

I do not here claim any features herein shown and also shown and claimed in my application for Letters Patent Serial No. 120,222.

Without limiting myself to the construction shown, I claim—

1. In an adding and recording machine, means for securing a record of additions or accumulations and either leaving the accumulating devices set at zero or retaining the accumulation, and a single operating device adapted to be set in different positions wholly before the operation of the machine to secure such records, substantially as described.

2. In an adding and recording machine, means whereby to secure either the record of a total and leave the machine clear or the record of a total and leave the same in the machine to be carried into subsequent operations, said means combined with a single device adjustable to different positions to set the parts in position before the operation of the machine to secure either of said results without manipulation after such operation commences, substantially as set forth.

3. The combination in an adding and recording machine, of devices for taking totals and subtotals, including a total-bar and a subtotal-bar, a single device for operating either of said bars, and means for locking each bar in its depressed position during the entire operation of the machine in taking the total or subtotal, substantially as set forth.

4. The combination with the recording and accumulating devices and number-keys of an adding-machine, of two independent bars, connections whereby each adjusts the parts to insure the recording of an accumulated amount and one adjusts the parts to retain the total on the accumulating devices, and a single device whereby the bars may be alternately depressed, substantially as set forth.

5. An adding and recording machine having accumulating and recording devices, two independent means for actuating the accumulating devices, a total and a subtotal bar, a single device for operating either of said bars, and connections whereby to put either or both means into operative connection with the accumulating devices, substantially as set forth.

6. The combination in an adding-machine, of recording mechanism, adding-pinions, connecting devices between the said mechanism and pinions, totalizing and subtotal bars, a single device for operating either of said bars, and means for adjusting the connecting devices to vary the times of connection between the adding-pinions and recording means, substantially as set forth.

7. In an adding and recording machine, the combination of adding-wheels, type-carriers, devices for operating the adding-wheels and moving the type-carriers simultaneously, two separate bars, a single device for operating either of said bars, and operating mechanisms for controlling the devices for operating the adding-wheels and the type-carriers, one of said mechanisms constructed to cause the said devices to operate to turn the wheels in one direction to accumulate and to adjust the type-carriers to print each number added, and the other mechanism constructed to cause the said devices to operate to turn the adding-wheels in the opposite direction to zero and to adjust the type-carriers to print the total and subsequently to take a subtotal by turning said adding-wheels to again indicate the same total, substantially as set forth.

8. The combination with the recording devices and adding-pinions, of racks for turning said pinions, independent means, including two independent bars, and a single operating device adjustable to different positions for carrying the racks and pinions into and out of engagement at different times, substantially as described.

9. In an adding and recording machine, means adapted to be wholly adjusted to set the parts in position before the operation of the machine to secure without further manipulation, first the record of a total leaving the machine clear, or second, such record leaving the total in the machine to be carried into subsequent operations, and a single operating device for adjusting said means, substantially as set forth.

10. The combination with the total and subtotal bars, the detents 205, strip 208 and lever 211, of the levers 705, 706, and connections between the levers 706 and 211, substantially as set forth.

11. The combination with the total and subtotal bars, the detents 205, strip 208 and lever 211, of the levers 705, 706, and a bearing on the lever 706 contacting with the lever 211, substantially as set forth.

12. The combination of the total and subtotal bars having shoulders or lugs, the levers 705, 706 and connections, and a lip $c$ extending from the lever 706 below both lugs, substantially as set forth.

13. The combination of the total and subtotal bars having shoulders or lugs, the levers 705, 706 and connections, a lip $c$ extending from the lever 706 below both lugs, a movable dog, and means for carrying the dog below and from the lip $c$, substantially as set forth.

14. The combination of the total and subtotal bars having shoulders or lugs, the levers 705, 706 and connections, a lip $c$ extending from the lever 706 below both lugs, a movable dog, the rod 300, and connections whereby to shift the dog by the movement of the rod, substantially as set forth.

15. The combination of the total and subtotal bars having shoulders or lugs, the levers 705, 706 and connections, a lip $c$ extending from the lever 706 below both lugs, a movable dog, the rod 300, lever $m$, and connections, whereby to shift the dog from the rod, substantially as set forth.

16. The combination of the total and subtotal bars having shoulders or lugs, the levers 705, 706 and connections, a lip $c$ extending from the lever 706 below both lugs, a movable dog, the rod 300, and connections whereby to shift the dog as the rod completes its movement, substantially as set forth.

In testimony whereof I have signed my name to this specification in the presence of two subscribing witnesses.

WILLIAM H. PIKE, JR.

Witnesses:
 EMILE C. BATAILLE,
 THOMAS H. PADDAIN.